US009621829B1

United States Patent
Boemler

(10) Patent No.: US 9,621,829 B1
(45) Date of Patent: Apr. 11, 2017

(54) IMAGING SYSTEM UNIT CELL AND METHODS FOR DYNAMIC RANGE IMAGING

(71) Applicant: RAYTHEON COMPANY, Waltham, MA (US)

(72) Inventor: Christian M. Boemler, Lompoc, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/984,383

(22) Filed: Dec. 30, 2015

(51) Int. Cl.
| | |
|---|---|
| *H04N 3/14* | (2006.01) |
| *H04N 5/335* | (2011.01) |
| *H04N 5/369* | (2011.01) |
| *H04N 5/376* | (2011.01) |
| *H04N 5/3745* | (2011.01) |

(52) U.S. Cl.
CPC .......... *H04N 5/3698* (2013.01); *H04N 5/376* (2013.01); *H04N 5/3745* (2013.01)

(58) Field of Classification Search
CPC .... H04N 5/347; H04N 5/37455; H04N 5/357; H04N 5/3745; H01L 27/14609
See application file for complete search history.

(56) References Cited

U.S. PATENT DOCUMENTS

| | | | | |
|---|---|---|---|---|
| 8,009,077 | B1* | 8/2011 | Melanson | H03M 3/368 |
| | | | | 341/143 |
| 8,780,418 | B1* | 7/2014 | Bluzer | H01L 27/14609 |
| | | | | 250/252.1 |
| 9,154,713 | B2* | 10/2015 | Denham | H04N 5/37455 |
| 2009/0303363 | A1* | 12/2009 | Blessinger | H04N 5/355 |
| | | | | 348/300 |
| 2010/0140732 | A1* | 6/2010 | Eminoglu | H01L 27/14634 |
| | | | | 257/447 |
| 2010/0194956 | A1* | 8/2010 | Yuan | H04N 5/35527 |
| | | | | 348/308 |
| 2013/0208157 | A1* | 8/2013 | Bechtel | H04N 5/3559 |
| | | | | 348/297 |

* cited by examiner

*Primary Examiner* — Kelly L Jerabek
(74) *Attorney, Agent, or Firm* — Lando & Anastasi

(57) ABSTRACT

Imaging system, imaging system unit cell, and a method of detecting an image. One example of an imaging system unit cell includes a photodetector configured to generate a photocurrent, a transimpedance amplifier circuit configured to integrate an electrical charge accumulated from the photocurrent during an integration period and provide an integration voltage at an output node, and quantization circuitry configured to generate a digital signal during the integration period based at least in part on the integration voltage, the quantization circuitry including a comparator configured to receive the integration voltage and a voltage ramp signal, compare the integration voltage and the voltage ramp signal, and determine an intersection of the voltage ramp signal and the integration voltage at an intersection time, and a latch coupled to the comparator and configured to latch a digital counter value corresponding to the intersection time, the digital signal including the digital counter value.

20 Claims, 6 Drawing Sheets

IMAGING SYSTEM UNIT CELL AND METHODS FOR DYNAMIC RANGE IMAGING

BACKGROUND

Focal Plane Arrays (FPAs) generally include a two-dimensional array of detector elements, or unit cells (i.e., pixels), organized in rows and columns. A circuit within each unit cell of the FPA accumulates charge corresponding to the flux of incident optical radiation at a photodetector within the unit cell to generate of an image of a scene or object within a field of view (FOV) of the FPA. For instance, most unit cell circuits detect optical radiation at a photodiode. The charge is accumulated at a single capacitive element, which integrates the charge, and produces an integration voltage. The integration voltage corresponds to the intensity of the flux over a given time period referred to as the integration period (or integration interval). The resulting voltage is conveyed by additional circuitry to an output of the FPA, which then may be used to construct the image of the scene that emitted the optical radiation. In some instances, such a voltage or charge can be digitized by circuitry of the FPA resulting in an array of binary values, at least one value for each unit cell of the FPA. Accordingly, in some instances FPAs may be used to convert a two-dimensional pattern of flux into a two-dimensional array of binary values, resulting in a digital image.

SUMMARY OF THE INVENTION

Aspects and embodiments are generally directed to imaging systems, FPA unit cells, and in particular, imaging system unit cell circuits with a high dynamic range and the capability to image both dark and bright features of a scene simultaneously. Rather than having a fixed integration period, various aspects and embodiments of the imaging system and unit cell circuits discussed herein are configured to integrate an accumulated electrical charge to produce an integration voltage and to simultaneously generate a digital signal based at least in part on the integration voltage. That is, in various embodiments the imaging system and unit cell circuits discussed herein are configured to dynamically scale the integration period of an individual unit cell based on an intensity of received optical radiation. In particular, various aspects and embodiments discussed herein are configured to compare the integration voltage and a voltage ramp signal to generate a digital signal based on the intensity of the optical radiation. The digital signal may be used to construct a digital image of the scene. Accordingly, technical advantages provided by aspects and embodiments may include improved feasibility and dynamic range, among various other advantages discussed below, relative to conventional imaging techniques.

According to an aspect, provided is an imaging system unit cell. One example of an imaging system unit cell includes a photodetector configured to generate a photo-current in response to receiving optical radiation, a transimpedance amplifier circuit including an amplifier, a feedback capacitor, and an output node, the transimpedance amplifier circuit configured to integrate an electrical charge accumulated from the photo-current during an integration period and provide an integration voltage at the output node, and quantization circuitry configured to generate a digital signal during the integration period based at least in part on the integration voltage, the quantization circuitry including a comparator coupled to the output node and configured to receive the integration voltage and a voltage ramp signal, compare the integration voltage and the voltage ramp signal, and determine an intersection of the voltage ramp signal and the integration voltage at an intersection time, and a latch coupled to the comparator and configured to latch a digital counter value corresponding to the intersection time, the digital signal including the digital counter value.

In an embodiment, the imaging system unit cell further includes a graycode counter coupled to the latch, and the digital counter value is a graycode counter value. In one embodiment, the imaging system unit cell further includes a control circuit coupled to the comparator and configured to provide the voltage ramp signal, and a rate of change of the voltage ramp signal is opposite in sign to a rate of change of the integration voltage during the integration period. In a further embodiment, the voltage ramp signal is substantially linear and the integration voltage is substantially linear during the integration period.

According to an embodiment, the voltage ramp signal includes a time delay, the voltage ramp signal being set to a constant value during the time delay, and the control circuit is configured to adjust the time delay. In an embodiment, the control circuit is configured to adjust the time delay to adjust a maximum photo-current receivable by the transimpedance amplifier circuit. In one embodiment, the graycode counter is configured to sweep a range of digital counter values, the digital counter value including a median value within the range when the intersection of the voltage ramp signal and the integration voltage corresponds to substantially 25% of the maximum photo-current.

According to an aspect, provided is a method of detecting an image. In one example, the method includes generating, with a photodetector, a photo-current in response to receiving optical radiation at the photodetector, integrating, with a transimpedance amplifier circuit, an electrical charge accumulated from the photo-current to provide an integration voltage at an output node of the transimpedance amplifier circuit during an integration period, receiving the integration voltage and a voltage ramp signal at a comparator of quantization circuitry coupled to the output node of the transimpedance amplifier, and comparing the integration voltage and the voltage ramp signal, determining an intersection of the voltage ramp signal and the integration voltage at an intersection time and latching a digital counter value corresponding to the intersection time via a latch coupled to the comparator, and providing a digital signal, the digital signal including at least the digital counter value.

In an embodiment, the method further includes receiving a graycode counter value from a graycode counter coupled to the latch, and the digital counter value is the graycode counter value. In one embodiment, the method further includes generating and providing the voltage ramp signal to the comparator, and a rate of change of the voltage ramp signal is opposite in sign to a rate of change of the integration voltage during the integration period. According to an embodiment, the method further includes adjusting a maximum photo-current receivable by the transimpedance amplifier circuit. In a further embodiment, adjusting the maximum photo-current receivable by the transimpedance amplifier circuit includes adjusting a time delay of the voltage ramp signal, the voltage ramp signal being set to a constant value during the time delay. In one embodiment, receiving the graycode counter value includes sweeping a range of digital counter values, the digital counter value including a median value within the range when the intersection of the voltage ramp signal and the integration voltage corresponds to substantially 25% of the maximum photo-current.

According to an aspect, provided is an imaging system. In one example, the imaging system includes a focal plane array including a plurality of unit cells, each unit cell of the plurality including a photodetector configured to generate a photo-current in response to receiving optical radiation, a transimpedance amplifier circuit configured to integrate an electrical charge accumulated from the photo-current during an integration period and provide an integration voltage at an output node, and quantization circuitry including a comparator coupled to the output node and configured to compare the integration voltage and a voltage ramp signal, and determine an intersection of the voltage ramp signal and the integration voltage at an intersection time, and a latch coupled to the comparator and configured to latch a digital counter value corresponding to the intersection time, and read-out circuitry coupled to the latch of each unit cell of the plurality and configured to receive the digital signal from the quantization circuitry of each unit cell of the plurality during the integration period, the digital signal including the digital counter value of each latch and the read-out circuit being configured to generate an image based on the digital signal.

In an embodiment, the read-out circuit includes a double-buffer coupled and in electrical communication with a multiplexer, and the double-buffer is configured to receive the digital signal from the quantization circuitry of each unit cell and the multiplexer is configured to multiplex the digital signals and generate a continuous data stream. According to one embodiment, the imaging system further includes a graycode counter coupled to the latch, and the digital counter value is a graycode counter value.

According to an embodiment, the imaging system further includes a control circuit coupled to the quantization circuitry of each unit cell and configured to provide the voltage ramp signal, and a rate of change of the voltage ramp signal is opposite in sign to a rate of change of the integration voltage of each unit cell during the integration period. In an embodiment, the voltage ramp signal is substantially linear and the integration voltage of each unit cell is substantially linear during the integration period. In one embodiment, the voltage ramp signal includes a time delay, the voltage ramp signal being set to a constant value during the time delay, and the control circuit is configured to adjust the time delay. According to an embodiment, the control circuit is configured to adjust the time delay to adjust a maximum photo-current receivable by the transimpedance amplifier circuit of each unit cell.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
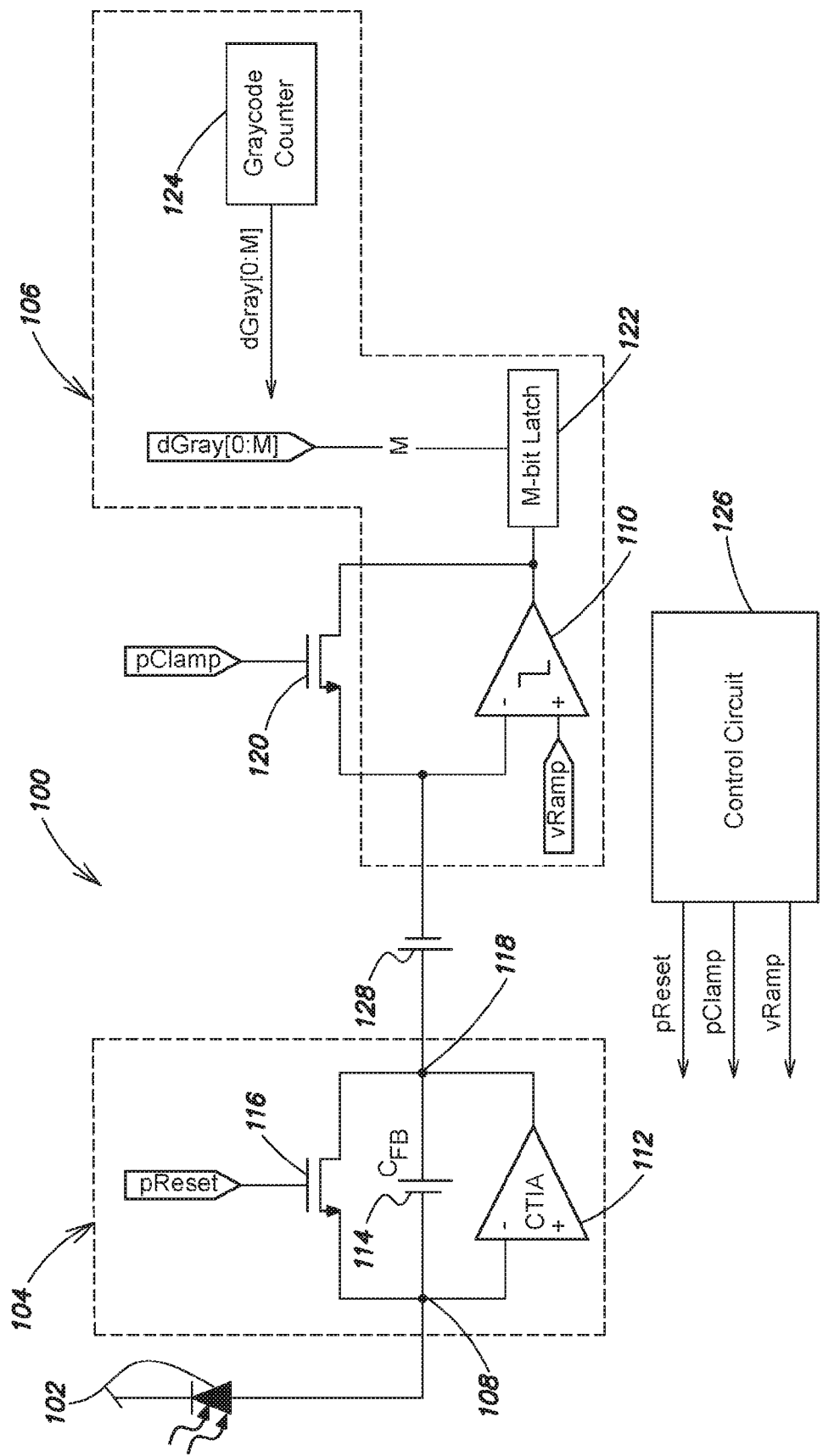
FIG. 1 is a schematic illustration of one example of imaging system unit cell circuit according to aspects of the invention.

Aspects and embodiments relate to imaging systems, Focal Plane Arrays (FPAs), and unit cells for FPAs. In particular, certain embodiments provide the capability to image a scene with high resolution while maintaining a high dynamic intensity range. That is, certain embodiments permit image data extraction from received optical radiation emitted from a viewed scene regardless of the intensity of the optical radiation. Specific aspects and embodiments discussed herein dynamically scale an integration period of an individual unit cell based on the intensity of the optical radiation received. In particular, aspects and embodiments generate an integration voltage based on the received optical radiation, and compare the integration voltage and a voltage ramp signal to generate a digital signal based on the intensity of the optical radiation. The digital signal may be used to construct a digital image of the scene. Accordingly, technical advantages provided by aspects and embodiments may include improved feasibility and dynamic range, among various other advantages discussed below, relative to conventional unit cell architectures.

As discussed above, typical unit cell circuits accumulate charge corresponding to the flux of impinging optical radiation. Typically, the charge is accumulated at a single capacitive element, which integrates the charge, and produces an integration voltage. While some natural imaging systems, such as the human eye, are biologically adaptive to accommodate bright and dark features of an image, conventional FPA unit cells typically saturate when the intensity of optical radiation becomes too large. For example, this may occur when glint conditions take place (e.g., visible light reflects off of an automobile). Indeed, many conventional FPA unit cells undesirably saturate when the intensity reaches a threshold limited by the parameters of the unit cell. This limits the amount of image data that can be extracted from the received optical radiation. In particular, many reconstruction algorithms, such as those used by three-dimensional polarimetric imagers, cannot tolerate even a few saturated FPA unit cells.

Conventional approaches to designing a high-dynamic intensity range imaging system, FPA, and FPA unit cells, have used MOS (Metal-Oxide-Semiconductor) transistor transfer functions to mimic the adaptability of natural imaging systems, such as the human eye. However, such approaches often involve non-linear mismatching, which may make calibration and non-uniformity correction impractical and challenging. Accordingly, various aspects and embodiments discussed herein provide an improved high-dynamic intensity range imaging system, FPA, and imaging system unit cell circuit. In particular, rather than having a fixed integration period, as suggested by conventional approaches, various aspects and embodiments of the imaging system, FPA, and imaging system unit cells discussed herein are configured to integrate an accumulated electrical charge to produce an integration voltage while simultaneously generating a digital signal based on the integration voltage. That is, in various embodiments the imaging system, FPA, and unit cell circuits discussed herein are configured to dynamically scale an integration period of an individual unit cell based on an intensity of received optical radiation. Such embodiments reduce the complexity of auto-exposure (AE) algorithms which may adjust a frame exposure time based on the response of a previous frame. Discussed embodiments permit discerning overly bright areas of an imaged scene during situations where an AE algorithm would otherwise still be searching for an optimal exposure setting. Discussed embodiments also may permit imaging during situations of instantaneous scene illumination.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 is a schematic illustration of one example of an imaging system unit cell circuit 100 according to aspects of the invention. In various embodiments the circuit 100 includes a photodetector 102, a transimpedance amplifier circuit 104, and quantization circuitry 106. As shown, the circuit 100 may also include a counter (e.g., a graycode counter 124) and a control circuit 126 (e.g., an auto-exposure control circuit). The imaging systems of various embodiments described herein, and further discussed with reference to FIG. 2, may include a FPA having a plurality of unit cell circuits, such as the unit cell circuit 100 shown in FIG. 1. In such embodiments, each unit cell of the FPA may be arranged in rows and columns, and coupled to read-out circuitry. While not shown in FIG. 1, in other embodiments, the imaging system unit cell circuit 100 may include a direct injection circuit, a buffered direct injection circuit, a source follower amplifier, and/or related circuit components.

In various embodiments, the photodetector 102 is configured to receive optical radiation of a given wavelength and generate a photo-current. The photodetector 102 is coupled to an input node 108 of the transimpedance amplifier circuit 104, and in electrical communication with at least components of the transimpedance amplifier circuit 104. In various embodiments, charge corresponding to the photo-current, and in particular a flux level (i.e., intensity/brightness) of the optical radiation received by the photodetector 102 is accumulated by the transimpedance amplifier circuit 104. It is appreciated that as the flux level increases, the photo-current generated by the photodetector 102 will cause the integration voltage to increase (or decrease) in a proportionate manner. In certain embodiments, the photodetector 102 may include any detector selected to be sensitive to optical radiation of a desired wavelength, and in particular embodiments, may include a plurality of diodes each being sensitive to different wavelengths. In at least one example, optical radiation includes visible light, infrared radiation, and/or ultraviolet radiation. For instance, the photodetector 102 may include a photo-diode configured to generate a photo-current responsive to receiving wavelengths of light ranging from as small as 0.3 microns up to 2.5 microns and greater. For example, optical radiation of a desired wavelength may be generated by one or more illuminators of an imaging system and be configured to illuminate the viewed scene. In other embodiments, the imaged scene may be self-emissive.

According to various embodiments, the transimpedance amplifier circuit 104 may include an amplifier 112, a feedback capacitor 114, and an output node 118. In particular, the transimpedance amplifier circuit 104 may include a capacitive transimpedance amplifier (CTIA) circuit including a source follower amplifier. The input node 108 of the transimpedance amplifier circuit 104 is coupled to the photodetector 102, as mentioned above. For example, FIG. 1 shows an inverting input of the amplifier 112 coupled to the input node 108, a first terminal of the feedback capacitor 114 coupled to the input node 108, and a first terminal of a reset switch 116 coupled to the input node 108. The transimpedance amplifier circuit 104 receives and amplifies the output of the photodetector 102 to a usable integration voltage within the unit cell circuit 100.

In particular, the transimpedance amplifier circuit 104 integrates the electrical charge accumulated from the photo-current during an integration period to generate the integration voltage. For example, the transimpedance amplifier circuit 104 may accumulate and integrate the electrical charge at the feedback capacitor 114, and provide the integration voltage at the output node 118. The feedback capacitor 114 may have any suitable predetermined value, which may be chosen to balance with a Correlated Double Sampling (CDS) capacitor 128 of one embodiment. In other embodiments, the circuit 100 may not include a CDS capacitor. For example, when operating within the short-wave infrared (SWIR) waveband, the feedback capacitor 114 may have a selected value ("$C_{FB}$") of 32 femto-farads coupled with a 500 femto-farad CDS capacitor, allowing a low noise floor. In another example, when operating within the long-wave infrared (LWIR) waveband, the feedback capacitor may have a selected value of 532 femto-farads, and the CDS capacitor 128 may be omitted to maximize a well capacity of the unit cell circuit 100.

In various embodiments, the control circuit 126 is configured to provide a control signal ("pReset") to the reset switch 116 to reset the transimpedance amplifier circuit 104 to an initial condition, and in particular, to set output of the transimpedance amplifier circuit 104 to a reset voltage. That is, in an embodiment, the control circuit 126 is configured to activate the reset switch 116 to end the integration period, and to reset the transimpedance amplifier circuit 104 for a subsequent integration period. As FIG. 1 shows, in one example the reset switch 116 may include a voltage controlled switch, such as a MOS transistor, and may receive one or more control voltages from the control circuit 126. However, in various other embodiments other suitable switching devices may be used.

In an example where the transimpedance amplifier circuit 104 includes a common source amplifier and the reset switch 116 includes a reset MOS transistor, a common mode reference of the transimpedance amplifier circuit is about the value of the control voltage received by reset MOS transistor. Accordingly, when the transimpedance amplifier circuit 104 is reset by the MOS transistor, the output of the transimpedance amplifier circuit 104 is set to the control voltage of the reset MOS transistor. As discussed in further detail below, because various components of the unit cell circuit 100 may dynamically adjust the integration period based on the intensity of the received optical radiation, the unit cell circuit 100 may end the integration period at various different times for any number of integration periods. In various embodiments, at the end of an integration period, and at the beginning of a subsequent integration period, the reset switch activates. As discussed above, activation of the reset switch will set the output of the transimpedance amplifier circuit 104 to the reset voltage, and deactivation of the reset switch will cause the transimpedance amplifier circuit 104 to begin integrating the stored charge.

As mentioned above, the unit cell circuit 100 may also include a CDS capacitor 128 interposed between the transimpedance amplifier circuit 104 and the quantization circuitry 106. The CDS capacitor 128 may be controlled by the control circuitry 126, for example, to perform various CDS techniques to improve noise performance. For example, a reference voltage may be removed from the integration voltage during each integration period to reduce the effects of kTC noise (Johnson-Nyquist noise) created by the components of the unit cell circuit 100 (e.g., kTC noise of the feedback capacitor 114). As shown, the CDS capacitor 128 may be coupled to a second switch 120 (e.g., a MOS transistor). In one embodiment, the second switch 120 is coupled to components of the quantization circuitry 106 and in electrical communication with the control circuit 126 to clamp the CDS capacitor 128 at a predetermined voltage. For instance, the second switch 120 may receive a voltage clamp signal ("pClamp") from the control circuit 126 to activate and clamp the CDS capacitor 128 at the kTC noise level of the feedback capacitor responsive to activation of the reset switch 116. During integration, the integration voltage is sampled through the CDS capacitor 128 to the quantization circuitry 106 to remove the effects of kTC noise.

In contrast to various conventional approaches, aspects and embodiments discussed herein dynamically scale the integration period of the unit cell circuit 100 based on the intensity of received optical radiation. In addition to permitting simultaneous generation of a digital signal (i.e., analog to digital conversion) during the integration period, such aspects and embodiments accommodate high-flux levels of optical radiation that would otherwise cause conventional unit cell circuits to undesirably saturate. In various embodiments, such processes are performed by the quantization circuitry 106 shown in FIG. 1. As shown, the quantization circuitry 106 may include a comparator 110 coupled to the output node 118 of the transimpedance amplifier circuit 104 (e.g., via the CDS capacitor 128 of one embodiment), and a latch 122 coupled to an output of the comparator 110. In further embodiments, the quantization circuitry 106 may include a counter (e.g., a graycode counter 124) coupled to the latch 122. While shown in FIG. 1 as separate from the control circuit 126, in various alternative embodiments the graycode counter 124 may be included within the control circuit 126 as a digital or analog component, for instance as a module of one or more microcontrollers of the control circuit 126.

In various embodiments, the comparator 110 receives the integration voltage from the transimpedance amplifier circuit 104. As described herein, the received integration voltage may include the integration voltage after a noise reduction process performed by the CDS capacitor 128. In various embodiments, the comparator 110 is also configured to receive a voltage ramp signal ("vRamp") from the control circuit 126. For example, the comparator 110 may receive the integration voltage at an inverting input, and the voltage ramp signal at a non-inverting input. The control circuit 126 of various embodiments is configured to generate and provide the voltage ramp signal, which may be generated based on a predetermined ramp function.

In one example, the voltage ramp signal is substantially linear and increases at a rate of change opposite in sign to a rate of change of the integration voltage during the integration period. That is, in various embodiments a slope of the voltage ramp signal may be positive, while a slope of the integration voltage is negative, or the slope of the voltage ramp signal may be negative, while the slope of the integration voltage is positive. In an example, if the integration voltage swings between a voltage of 2.5V at low flux conditions, and a voltage of 0.5V at high flux conditions (e.g., saturation conditions), and an integration period maximum ("$t_{period}$") is set to be 10 ms, the voltage ramp signal may be generated to have a rate of change of about 200V/s. The voltage ramp signal may also include a time delay ("$t_{Del}$"), during which the voltage ramp signal is set to a constant voltage value. In the discussed example, the time delay is chosen to be about 0s. Accordingly, the voltage ramp signal may increase from a starting value of 0.5V to a maximum value of 2.5V at a rate of change of about 200V/s, and in a direction substantially opposite a direction of the rate of change of the integration voltage. As such, if the photo-current of the unit cell circuit 100 is substantially 0A, the integration voltage and the voltage ramp signal would have a substantially same value at the end of the integration period maximum (i.e., 10 ms), whereas, if the unit cell circuit 100 produces an integration voltage having a rate of change substantially the same, but opposite in sign, from the voltage ramp signal (e.g., when photo-current=(200V/s)*($C_{FB}$)), the integration voltage would have a value substantially the same as the voltage ramp signal at about half-way through the integration period. In either scenario, such an intersection of values would cause the comparator to trip. Comparison of the integration voltage and voltage ramp signal is further discussed below.

In one embodiment, the control circuit 126 (e.g., auto-exposure control circuit) may dynamically adjust the voltage ramp signal by increasing or decreasing a duration of the time delay, $t_{Del}$. As further described below, while in one embodiment the time delay occurs at a beginning of the integration period of the unit cell circuit 100, in various other embodiments, the time delay may occur at other instances during the integration period. Following the time delay, the voltage ramp signal increases linearly at the rate of change until a maximum voltage ramp value is reached.

In certain embodiments, the control circuit 126 may adjust a maximum or minimum photo-current receivable by the transimpedance amplifier circuit 104. For instance, a desirable maximum or minimum photo-current may be accommodated by adjusting the time delay of the voltage ramp signal. For example, the control circuit 126 may increase the time delay to prolong when the integration voltage intersects the voltage ramp signal, so as to accommodate a low photo-current and extract image data from low flux level optical radiation. Similarly, the control circuit 126 may decrease the time delay to expedite when the integration voltage intersects the voltage ramp signal, so as to accommodate a high photo-current and extract image data from high flux level optical radiation. The time delay of the voltage ramp signal may be set to any value from about 0 (i.e., no time delay) to a suitable larger value (e.g., 2 ms).

In various embodiments, a value of the time delay of the voltage ramp signal may be determined to correlate the maximum photo-current with a particular digital signal value, such as a maximum digital counter value. With reference to the above example, setting the time delay of the voltage ramp signal to about 2 ms would increase the rate of change of the voltage ramp signal to about 250V/s. In such a situation, the maximum photo-current of the unit cell circuit 100, would be adjusted to occur when the integration voltage intersects the voltage ramp signal at 2 ms (e.g., when photo-current=$C_{FB}$*2V/2m5). When the integration voltage intersects the voltage ramp signal at 2 ms, the maximum digital counter value may be held by the latch 122. Accordingly, the digital counter value would correspond to a maximum digital output value representative of the highest allowable photo-current level.

In certain embodiments, to set the minimum digital output value to a non-zero photocurrent (e.g., if the "background" signal mainly stems from infrared emission of non-cooled optics), the voltage ramp signal can be generated to intersect a non-zero integration voltage at the end of the integration period. For instance, with continuing reference to the example using a 2 ms time delay, the voltage ramp signal may be set to have a rate of change of 125V/s. In such an example, at the end of the 10 ms integration period maximum, the voltage ramp signal would be 1.5V (e.g., 0.5V+125 V/s*(10 ms-2 ms)), which is about 50% of the voltage swing from 0.5V to 2.5V.

Accordingly, in various embodiments the maximum and/or minimum photo-current and the maximum and minimum digital counter values of the digital counter of the circuit 100 may be adjusted using the time delay of the voltage ramp signal and the rate of change of the voltage ramp signal. Such embodiments may allow adjustment of the range of detectable photo-current levels of the unit cell circuit 100. In the examples discussed above, the adjustments may be set through a user interface of the control circuit 126, for example. Further examples of the voltage ramp signal are discussed below with reference to FIGS. 2 and 3.

As noted above, the comparator 110 of the quantization circuitry 106 is configured to compare the received integration voltage and voltage ramp signal, and determine an intersection of the voltage ramp signal and the integration voltage at an intersection time. For instance, comparing the integration voltage and the voltage ramp signal may include determining when a voltage value of the integration voltage substantially equals a voltage value of the voltage ramp signal. The moment at which this intersection occurs is referred to herein as the intersection time. For example, during the integration period the comparator 110 of the quantization circuitry 106 may compare the integration voltage and the voltage ramp signal, trip, and generate a comparator signal when a voltage value of the integration voltage substantially equals a voltage value of the voltage ramp signal (i.e., the integration voltage intersects the voltage ramp signal). In such an example, the comparator signal may include a digital comparator signal to be received by the latch 122.

The latch 122 receives the comparator signal from the comparator 110, and responsively latches a digital counter value ("dGray[0:M]") received from the graycode counter 124. For example, the digital counter value may include a graycode counter value. In various embodiments, the latched digital counter value corresponds to the intersection time. That is, during the integration period, the graycode counter 124 is configured to sweep a range of digital counter values (e.g., [0:M]) in a sequential order. In one example, the sweep by the graycode counter 124 may be delayed for the duration of the time delay of the voltage ramp signal. However, in various other embodiments, the graycode counter 124 is configured to begin sweeping the range of digital counter values at the beginning of the integration period, and reset the sweep for each subsequent integration period. Each digital counter value of the range of digital counter values swept by the digital counter corresponds to a moment in time during the integration period. For example, the graycode counter 124 may count down from the maximum digital counter value starting at the end of the time delay, $t_{Del}$, and ending at the minimum digital counter value at the integration period maximum $t_{period}$. In such an embodiment, the latch 122 holds the latched digital counter value in a holding register at the intersection time.

When the latch 122 receives the comparator signal from the comparator indicating that the integration voltage intersects the voltage ramp signal, the latch 122 holds the current digital counter value of the sweep, that value corresponding to the intersection time. The latched digital counter value may then be provided as a digital signal to various downstream components and used to generate an image of the viewed scene. As such, integration voltages that may otherwise exceed a saturation threshold during an integration period in a conventional unit cell circuit may be dynamically accommodated by the unit cell circuit 100. In such situations where optical radiation of a high flux level is received, the integration voltage intersects the ramp trace, and a digital counter value is latched, before a saturation level is reached. Illustration of a compared integration voltage and voltage ramp signal, and the intersection thereof, according to various examples, is shown and further discussed with reference to FIGS. 2 and 3. In certain embodiments, the control circuit 126 may dynamically adjust the minimum and/or maximum photo-current of the unit cell circuit 100 for a subsequent integration period responsive to generation of the digital signal.

Various embodiments of the imaging systems described herein as including a plurality unit cells, such as one or more of the unit cell circuit 100 discussed with reference to FIG. 1, may generate a digital image based on a digital signal received from each unit cell of the plurality. For example, each digital counter value may correspond to a predetermined brightness of optical radiation emitted from the viewed scene. Because the rate of change of the transimpedance amplifier output is substantially proportional to the respective photo-current, the intersection time of the integration voltage of each unit cell and the voltage ramp signal will be a non-linear function of each photo-current. In various embodiments, each unit cell of the plurality continuously compares an integration voltage to the same voltage ramp signal. Accordingly, the value of the integration voltage when an intersection with the voltage ramp signal occurs may be ascertained according to:

$$V_{intersect} = V_{reset} - t\frac{I_{photo}}{C_{FB}} = V_{start} + \text{slope}(t - t_{del})$$

Where $V_{reset}$ includes the reset voltage value, $C_{FB}$ includes the value of the feedback capacitor, $V_{start}$ includes the initial value of the voltage ramp signal, "slope" includes the rate of change of the voltage ramp signal, "t" includes the intersection time, and -Del includes the time delay. As such, the intersection time may be ascertained according to:

$$t = \frac{V_{reset} - V_{start} - \text{slope}(t_{del})}{\left(\left(\frac{I_{photo}}{C_{FB}}\right) - \text{slope}\right)}$$

whenever the photocurrent is less than the maximum value set by the delay of:

$$I_{photo} < C_{FB}\left(\frac{V_{reset} - V_{start}}{t_{del}}\right).$$

In one embodiment, when the time delay is set to substantially 0s, the maximum photo-current of the unit cell circuit 100 is substantially infinite, allowing for possibly infinite photo-current detection. Accordingly, the intersection time, and hence the resulting digital signal of various embodiments, is effectively proportional to the inverse of the photo-current (i.e., $1/I_{photo}$). This is in contrast to many traditional imaging systems, which set an analog-to-digital signal directly proportional to the photo-current. Accordingly, such embodiments reduce the quantization step of the digital signal as the integration voltage increases, thereby increasing the quantization noise as the photo shot-noise also increases. As further discussed above, and further in contrast to conventional unit cell architectures, such an arrangement permits the unit cell circuits (e.g., unit cell circuit 100) to automatically scale the integration period to the intensity of the received optical radiation. Such embodiments avoid the non-linear mismatching challenges of known approaches, and in particular, improve feasibility and dynamic range of imaging systems.

While not shown in FIG. 1, in various embodiments the control circuit 126 may further include a controller operatively connected to and configured to activate and/or deactivate one or more of the switches of various embodiments, such as the reset switch 116 and the second switch 120. The controller may include a single controller; however, in various other embodiments the controller may consist of a plurality of controllers and/or control subsystems which may include an external device, signal processing circuitry, or other control circuitry. In particular, the control circuit 126 may include analog processing circuitry (e.g., a microcontroller) and/or digital signal processing circuitry (e.g., a digital signal processor (DSP)). For instance, the microcontroller of various embodiments may include a processor core, memory, and programmable input/output components. The control circuit 126 may be configured to automatically control various components of the unit cell circuit 100, such as the one or more switches and/or the graycode counter 124.

Figure 2:
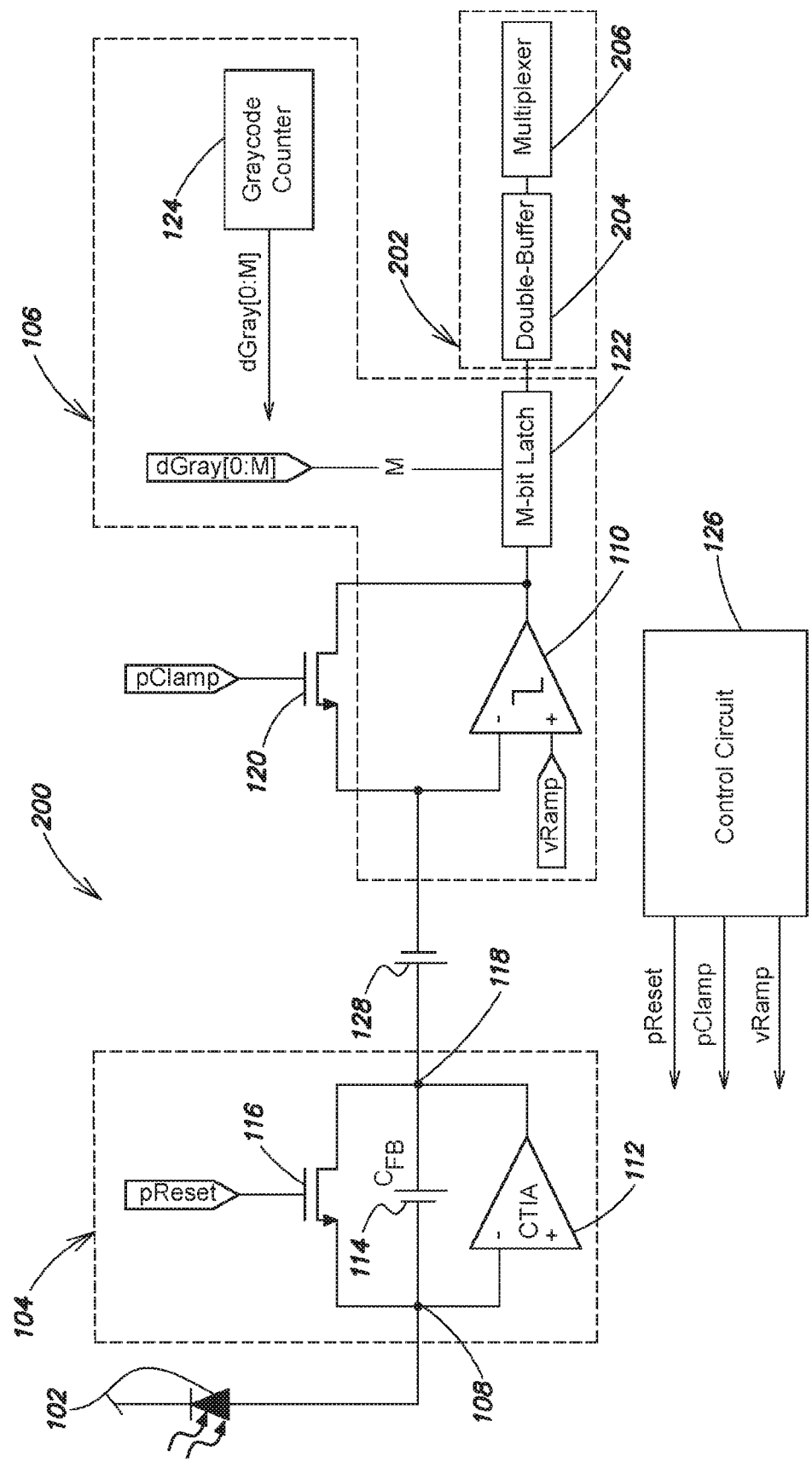
FIG. 2 is a schematic illustration of one example of an imaging system including the unit cell of FIG. 1, according to aspects of the invention.

FIG. 2 shows a schematic illustration of one example of an imaging system 200 including the unit cell circuit 100 of FIG. 1. While in various embodiments the imaging system 200 includes a FPA (not shown in FIG. 2) having a plurality of unit cells, the imaging system 200 of FIG. 2 is shown as having a single unit cell circuit to simplify explanation. In particular, each unit cell of the FPA may be arranged in rows and columns, the latch of each unit cell circuit being coupled to read-out circuitry 202 and a common bus. Each unit cell circuit of the FPA may include a photodetector, a transimpedance amplifier circuit, and quantization circuitry, as discussed above with reference to FIG. 1.

In various embodiments, the read-out circuitry 202 of the imaging system 200 receives a digital signal from the quantization circuitry of each unit cell of the plurality of unit cells of the FPA. Each digital signal may include a latched digital counter value. The digital counter values may be each associated with an intensity of optical radiation received by the unit cell and may be used to generate an image of a scene viewed by the imaging system 200. In particular, each digital counter value may be associated with an intensity of light received by a unit cell and emitted from a portion of the scene within a field of view of the particular unit cell. As shown, the digital signals may be aggregated and received by a double-buffer 204 coupled and in communication with each unit cell. The double-buffer 204 is additionally coupled and in electrical communication with a multiplexer 206.

The double-buffer 204 of at least one embodiment receives the digital signals from the plurality of unit cells and transfers the signals to the multiplexer 206 when a complete image data set is captured. For instance, a complete image data set may occur when a digital signal is received for each unit cell of the plurality of unit cells of the FPA, or a pre-determined subset of the plurality of unit cells. Accordingly, in one embodiment the double-buffer 204 includes more than one buffer, each buffer configured to sequentially draw digital counter values from the plurality of unit cell circuits. As such, the multiplexer 206 will receive a complete version of the image data from the double-buffer 204, instead of an incomplete data set. The multiplexer 206 of various embodiments is configured to multiplex the digital signals received from the double-buffer 204 and generate a continuous data stream. In various examples, the multiplexer 206 allows digital signal values to be selected one row at a time, and transferred onto a bus one column of unit cells at a time. Buses may be serialized for each selected row, and may deliver high speed output streams for downstream components.

Figure 3:
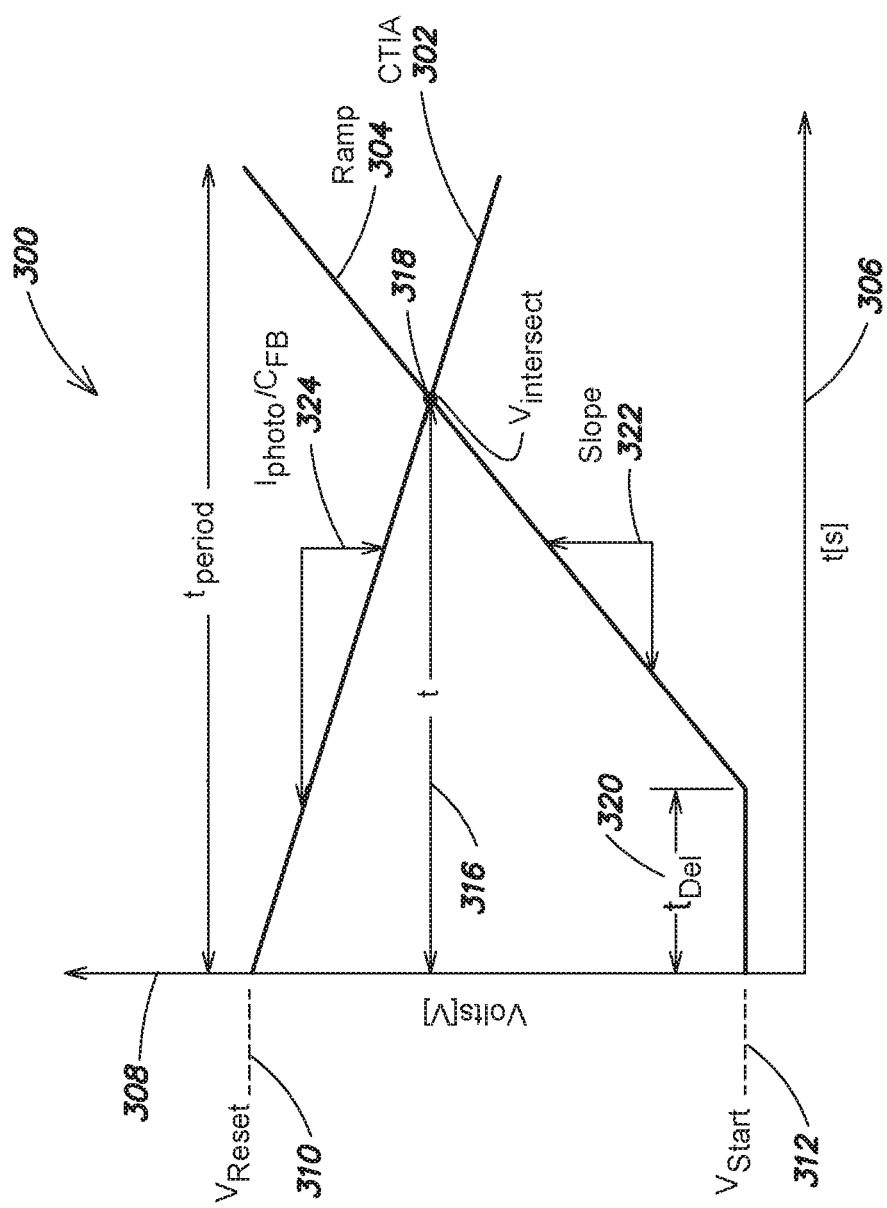
FIG. 3 is an illustration of one example of a compared integration voltage and voltage ramp signal, as performed by the imaging system unit cell of FIG. 1, according to aspects of the invention.

Turning now to FIG. 3, FIG. 3 shows an illustration 300 of one example of a compared integration voltage and voltage ramp signal, as performed by the imaging system unit cell circuit 100 shown in FIG. 1. FIG. 3 is discussed with continuing reference to the unit cell circuit 100 shown in FIG. 1. In the illustration 300, a voltage trace 302 represents the output of the transimpedance amplifier circuit (i.e., the integration voltage), and a ramp trace 304 represents the voltage ramp signal. The voltage and ramp traces 302, 304 are plotted along a vertical axis 308 having units of measurement in voltage and a horizontal axis 306 having units of measurement in time (e.g., ms) for sake of explanation. At the beginning of the integration period, a value of the voltage trace 302 is about equal to the reset voltage (shown as ghost line 310) and changes at a rate of change 324 about equal to the ratio of the photo-current ($I_{photo}$) to the feedback capacitor value ($C_{FB}$). Similarly, a value of the ramp trace 304 begins at an initial value ($V_{start}$) (shown as ghost line 312), and following a time delay 320, changes at a rate of change 322 illustrated as "Slope." The ramp trace 304 is shown intersecting the voltage trace 302 at the intersection time (t) 316, and at an intersection voltage indicated by point 318. While shown in FIG. 3 as including the time delay 320 at the beginning of the ramp trace 304, in various embodiments the voltage ramp signal may not have a time delay, or may include a time delay which occurs at a different instance during the voltage ramp signal.

As discussed above, and shown in the illustration 300, the rate of change 304 of the ramp trace 304 is opposite in sign to the rate of change 324 of the voltage trace 302. Additionally, the slope of the integration voltage is proportional to the photo-current created by the photodetector (e.g., photodetector 102), and the intersection time between the integration voltage and the voltage ramp signal is a non-linear function of the photo-current. Therefore, continuous comparison of the integration voltage and voltage ramp signal, permits the unit cell circuit 100 to automatically scale the integration period based on the intensity of the optical radiation received. This is in contrast to conventional dynamic range approaches which require a priori intensity information or the merger of multiple integration periods.

Figure 4:
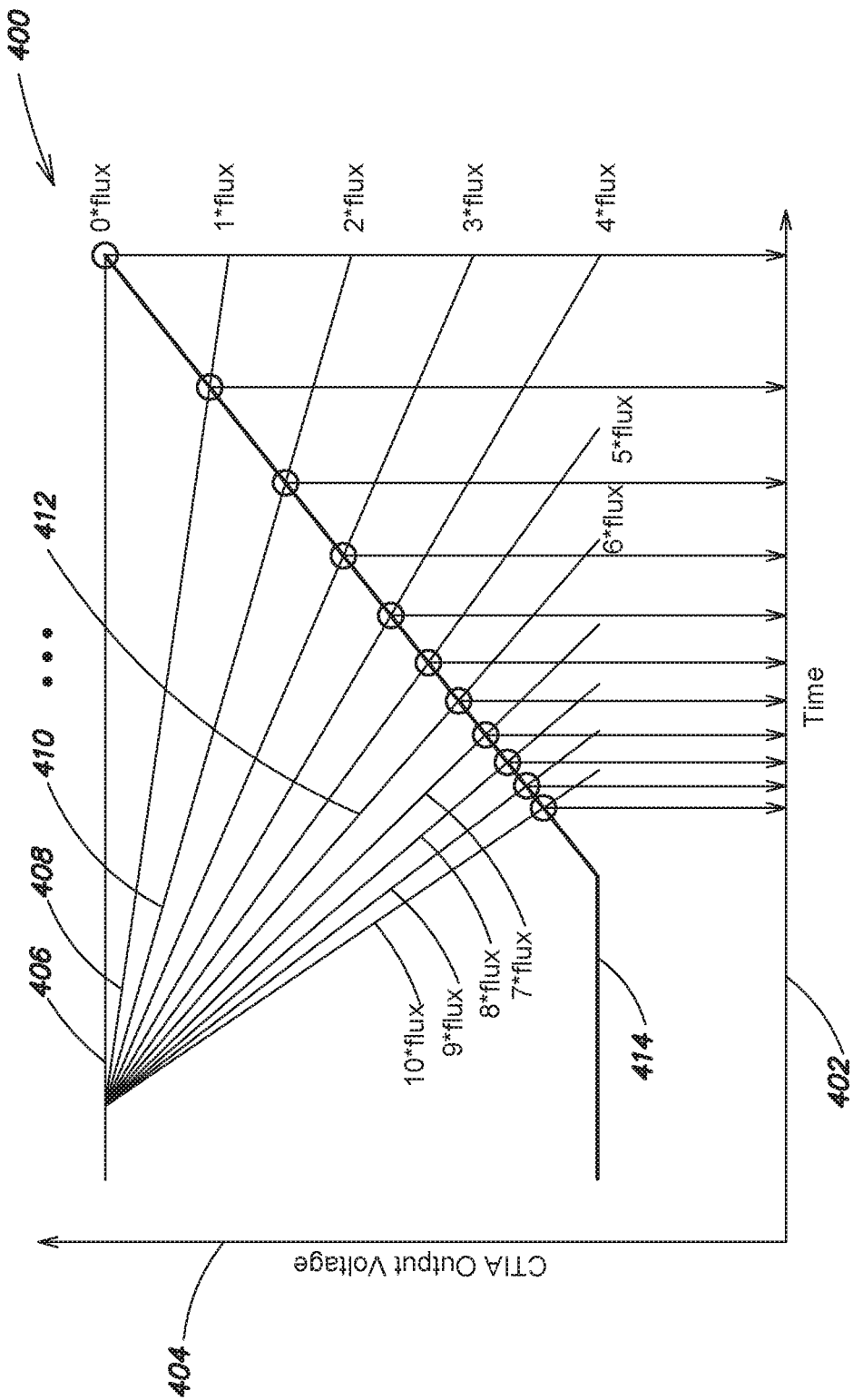
FIG. 4 is an illustration of one example of the integration of multiple photocurrents, as performed by the imaging system unit cell of FIG. 1 according to aspects of the invention.

FIG. 4 is an additional illustration of one example of integration of multiple photocurrents and a fixed voltage ramp signal, as performed by the imaging system unit cell circuit 100 of FIG. 1. In particular, FIG. 4 illustrates different example integration periods as a function of linear increments in the photo-current generated by the photodetector. For example, a first voltage trace 406 represents the integration voltage at a first flux level, a second voltage trace 408 represents the integration voltage at a second flux level, a third voltage trace 410 represents the integration voltage at a third flux level, and so on for a fourth through thirteenth voltage trace. Each voltage trace is continuously compared to a voltage ramp signal represented by ramp trace 414. The voltage traces 406, 408, 410 and ramp trace 414 are plotted along a vertical axis 404 having voltage units of measurement, and a horizontal axis 402 having time-based units of measurement for the sake of explanation. FIG. 4 is discussed with continuing reference to FIG. 1.

As FIG. 4 shows, as the photo-current increases, the voltage traces intersect the ramp trace 414 at an increasingly shorter intersection time. For example, the third voltage trace 410 intersects the ramp trace 414 at a shorter intersection time than the second voltage trace 408. In such a way, various embodiments can accommodate both exceptionally high flux levels and exceptionally low flux levels. In particular, latching a digital counter value when the integration voltage intersects the voltage ramp signal allows aspects and embodiments to extract image data from the received optical radiation, even when the unit cell circuit (i.e., unit cell circuit 100) would otherwise saturate. For instance, the tenth voltage trace 412 represents a large flux-level relative to normal operating conditions. The large-flux level may result, for example, from a glint condition. Despite a trajectory that would otherwise exceed a saturation threshold in a conventional unit cell circuit, in the shown example, the integration voltage intersects the ramp trace 414, and a digital counter value is latched, before a value of the tenth voltage trace 412 reaches such a level. Based on the intersection time, and in particular the latched digital counter value which corresponds to the intersection time, one or more components of the unit cell circuit (such as the control circuit 126) may adjust a maximum and/or minimum photo-current of the unit cell circuit such that a subsequent frame of operation may adequately accommodate the received flux level of optical radiation.

Figure 5:
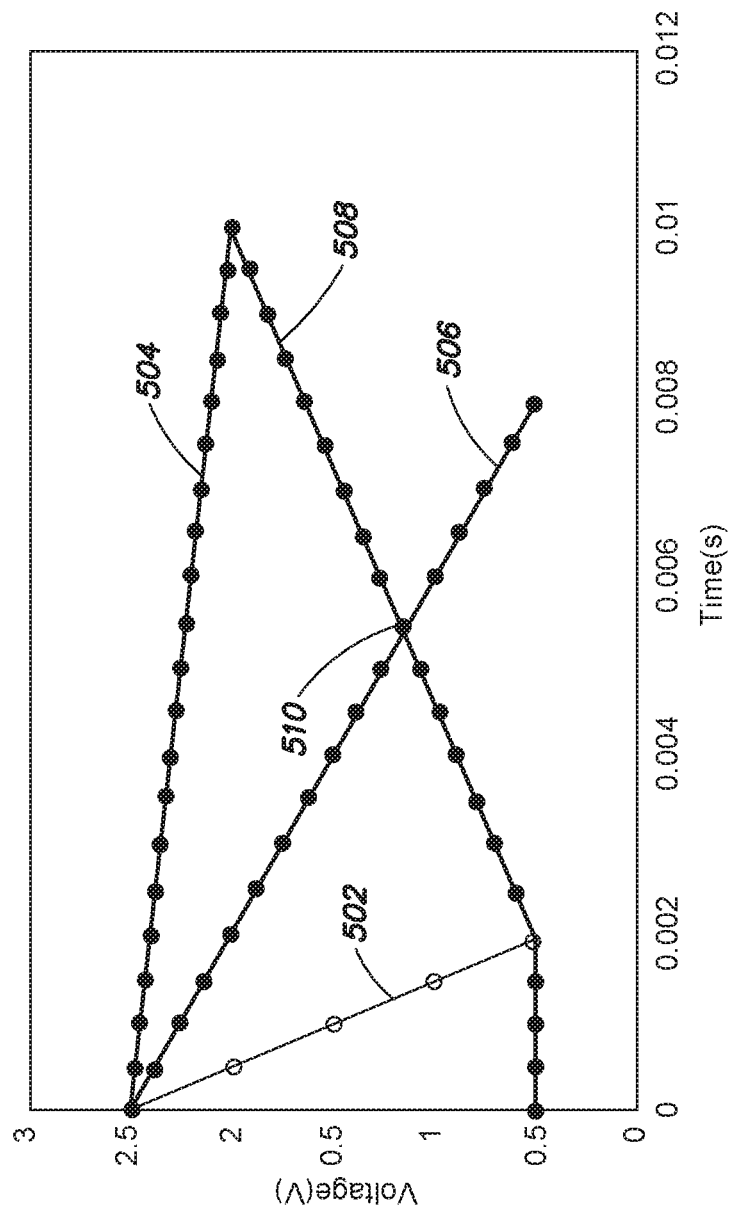
FIG. 5 is another illustration of one example of the integration of multiple photo-currents, as performed by the imaging system unit cell of FIG. 1 according to aspects of the invention.

FIG. 5 is another illustration of one example of compared integration voltages and a voltage ramp signal, as performed by the imaging system unit cell circuit 100 of FIG. 1. In particular, FIG. 5 illustrates a first integration voltage intersecting a fixed voltage ramp signal at a maximum photo-current, a second integration voltage intersecting the fixed voltage ramp signal at a minimum photo-current, and a third integration voltage intersecting the fixed voltage ramp signal at about twenty-five percent (25%) of the maximum photo-current. A first voltage trace 502 represents the first integration voltage, a second voltage trace 504 represents the second integration voltage, a third voltage trace 506 represents the third integration voltage, and a ramp trace 508 represents the voltage ramp signal. In certain embodiments, the intersection time of the third integration voltage (shown as point 510) may correspond to a substantially median digital counter value (i.e., fifty-percent (50%)) in a range of digital counter values. That is, in certain embodiments, when the third integration voltage intersects the voltage ramp signal at about 25% of the maximum photo-current, the digital counter value received by the latch may be at about a half-way point of a digital counter value sweep performed by the digital counter. Such an embodiment may account for larger quantization steps when the integration voltage rapidly increases. As discussed in more detail above, in various embodiments the maximum and or minimum photo-current may be adjusted, which may effect and adjust a rate of change, and/or a time delay, of the voltage ramp signal to accommodate the desired photo-current range.

Figure 6:
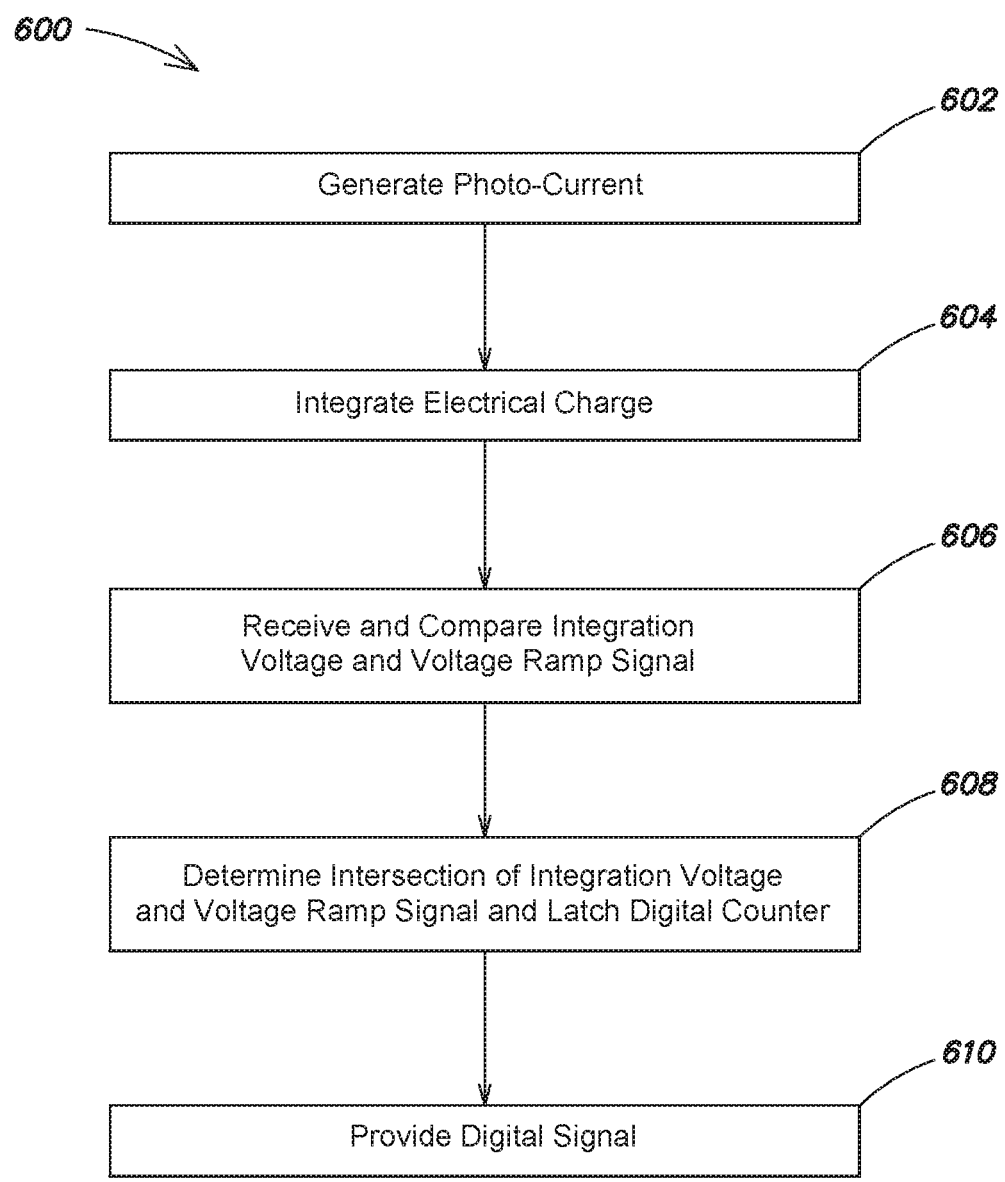
FIG. 6 is an example imaging process flow according to aspects of the invention.

As described with reference to FIGS. 1-5, several embodiments perform processes for detecting an image. In some embodiments, these processes are executed by an imaging system, FPA, and/or imaging unit cell, such as the unit cell circuit 100 described above with reference to at least FIG. 1. One example of such a process is illustrated in FIG. 6. According to this example, the process 600 may include acts of generating a photo-current, integrating an electrical charge accumulated from the photo-current to generate an integration voltage, receiving and comparing the integration voltage and a voltage ramp signal, determining an intersection of the integration voltage and the voltage ramp signal, latching a digital counter, and providing a digital signal.

In various embodiments, the process 600 includes generating a photo-current in response to receiving optical radiation at a photodetector (act 602). The circuit accumulates electrical charge corresponding to the flux level of the optical radiation at a charge storing device of the transimpedance amplifier circuit (e.g., a feedback capacitor). As discussed above, optical radiation may include visible light, infrared radiation, and/or ultraviolet radiation. In further embodiments, the process 600 may include generating optical radiation of a particular wavelength and directing the optical radiation at a scene to be imaged within a field of view of a FPA including at least the unit cell circuit. Accordingly, receiving optical radiation at the photodetector may include receiving optical radiation reflected from the scene to be imaged.

Responsive to generating the photo-current, the process 600 may include receiving and amplifying the output of the photodetector. In particular, the process 600 may include integrating the electrical charge accumulated from the photo-current to provide an integration voltage during an integration period (act 604). Specifically, the process 600 may include integrating the accumulated electrical charge at the feedback capacitor of the transimpedance amplifier circuit to provide an integration voltage at an output node of the transimpedance amplifier circuit. The process 600 may then include receiving the integration voltage and a voltage ramp signal at a comparator of quantization circuitry coupled to the output node of the transimpedance amplifier, and comparing the integration voltage and the voltage ramp signal (act 606).

As described with reference to at least FIG. 1, certain implementations of the unit cell circuit may include a Correlated Double Sampling (CDS) capacitor interposed between the transimpedance amplifier circuit and the quantization circuitry. Accordingly, in one embodiment receiving the integration voltage may include receiving the integration after performing one or more noise correction processes, such as CDS on the integration voltage. For example, the process 600 may include removing a predetermined reference voltage from the integration voltage during the integration period to eliminate the kTC noise created by resetting the integration capacitor. Such processes are further described with reference to the CDS capacitor 128 shown in FIG. 1.

Process 600 may also include processes for dynamically scaling the integration period of the unit cell circuit based on the intensity of received optical radiation. Such aspects and embodiments permit simultaneous generation of a digital signal (i.e., analog to digital conversion) during the integration period. For example such processes may be performed by the quantization circuitry shown in FIG. 1. Accordingly, the process 600 shown in FIG. 6 may further include determining an intersection of the voltage ramp signal and the integration voltage at an intersection time, and latching a digital counter value based at least in part on the intersection time via a latch coupled to the comparator (act 608).

In one example, the voltage ramp signal is substantially linear and increases at a rate of change opposite in sign to a rate of change of the integration voltage, which may also change during the integration period in a linear manner. That is, in various embodiments a slope of the voltage ramp signal is opposite in sign to a slope of the integration voltage during the integration period. The process 600 may further include generating and providing the voltage ramp signal to the comparator, for example, based on a predetermined ramp function. As described above, the components of the unit cell circuit may perform processes for adjusting a maximum and/or minimum allowable photo-current of the transimpedance amplifier circuit. For instance, such process 600 may be advantageous to prevent damage to circuit components. In such embodiments, the process may include adjusting the rate of change and/or time delay of the voltage ramp signal, the voltage ramp signal being set to a constant value during the time delay.

While in one embodiment the time delay occurs at a beginning of the integration period of the unit cell circuit, in various other embodiments, the time delay may occur at other instances during the integration period. Following the time delay, the voltage ramp signal increases linearly at the rate of change until a maximum threshold is reached. As such, adjusting the time delay may change the intersection time of the voltage ramp signal and the integration voltage. For example, at a time delay of 0 ms, the voltage ramp signal will immediately increase (or decrease) at a rate of change opposite in sign to that of the integration voltage. However, at a time delay of 1 ms, the value of the voltage ramp signal will remain constant delaying intersection of the voltage ramp signal and the integration voltage. In this manner, the time delay may be decreased to accommodate large flux levels, and increased to accommodate low flux levels.

In one instance, determining an intersection of the voltage ramp signal and the integration voltage may include determining when a voltage value of the integration voltage substantially equals a voltage value of the voltage ramp signal. The moment at which this intersection occurs includes the intersection time. In various embodiments, comparing the integration voltage and the voltage ramp signal includes continuously comparing values from the voltage integration and voltage ramp signal such that the intersection can be determined rapidly and in real-time.

As discussed above, the process 600 may include the act of latching a digital counter value based at least in part on the intersection time. Such an act may be performed by a latch coupled to a digital counter (e.g., a graycode counter such as the graycode counter 124 shown in FIG. 1). In particular, determining an intersection of the voltage ramp signal and the integration voltage may include generating a comparator signal when the integration voltage and the voltage ramp intersect (e.g., a value of the voltage ramp signal and a value of the integration voltage are about the same). In such an embodiment, latching the digital counter value may be performed responsive to receiving the comparator signal.

During the integration period, and while the act of comparing the integration voltage and the voltage ramp signal is performed (i.e., act 606), the process 600 may include sweeping a range of digital counter values, each value being sequentially provided to the latch from the digital counter. For example, the process 600 may include sweeping from a maximum digital counter value to a minimum digital counter value. In one application, the sweep may begin following one or more unit cell circuit reset processes. In various embodiments, each digital counter value of the range of digital counter values swept by the digital counter corresponds to a moment in time during the integration period. When the latch receives the comparator signal from the comparator indicating that the integration voltage intersects the voltage ramp signal, the latch holds the current digital counter value of the sweep, that value corresponding to the intersection time. The process 600 may then include providing a digital signal (act 610) including at least the latched digital counter value to generate a digital image. As described above, the digital signal may be provided to read-out circuitry such as a double-buffer and a multiplexer, in addition to digital signals from numerous other unit cells within a FPA.

In particular, imaging systems described herein as including a plurality unit cell circuits, such as the circuit 100 discussed with reference to FIG. 1, may generate a digital image based on the digital signal received from each unit cell circuit of the plurality. For example, each digital counter value may correspond to a predetermined brightness of optical radiation received. Because the rate of change of the transimpedance amplifier output is proportional to the photo-current, the intersection time when the integration voltage and the voltage ramp signal intersect is a non-linear function of the photo-current. In particular embodiments, the process 600 may include adjusting a minimum or maximum photo-current of the unit cell circuit for a subsequent integration period based at least in part on the digital signal received from the unit cell circuit (or a plurality of unit cell circuits). For instance, responsive to receiving a digital counter value indicating that a value of the photo-current is about equal to the current maximum photo-current, the process 500 may include adjusting the maximum and/or minimum photo-current of the unit cell circuit for a subsequent integration period such that the value of the photo-current is about equal to 25% of the maximum photo-current for that subsequent integration period.

In further examples, the process 600 may include acts of activating and/or de-activating one or more of the switches of various embodiments, such as the reset switch and/or second switch. For instance, the process 600 may include receiving one or more control signals (i.e., control voltages) from the control circuit. In one example, the transimpedance amplifier circuit includes a common source amplifier where a common mode reference is a threshold of a reset switch including a reset MOS transistor. When reset occurs, the process 600 includes activating the reset MOS transistor, and setting the output of the transimpedance amplifier to the threshold voltage of the reset MOS transistor. As discussed above, because various components of the unit cell circuit dynamically adjust the integration period based on the intensity of the received optical radiation, the reset switch may reset the operation of the transimpedance amplifier circuit at various times during subsequent integration periods.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging system unit cell comprising:
   a photodetector configured to generate a photo-current in response to receiving optical radiation;
   a transimpedance amplifier circuit including an amplifier, a feedback capacitor, and an output node, the transimpedance amplifier circuit configured to integrate an electrical charge accumulated from the photo-current during an integration period and provide an integration voltage at the output node; and
   quantization circuitry configured to generate a digital signal during the integration period based at least in part on the integration voltage, the quantization circuitry including:
      a comparator coupled to the output node and configured to receive the integration voltage and a voltage ramp signal, compare the integration voltage and the voltage ramp signal, and determine an intersection of the voltage ramp signal and the integration voltage at an intersection time, and
      a latch coupled to the comparator and configured to latch a digital counter value corresponding to the intersection time, the digital signal including the digital counter value.

2. The imaging system unit cell according to claim 1, further comprising a graycode counter coupled to the latch, wherein the digital counter value is a graycode counter value.

3. The imaging system unit cell according to claim 2, further comprising a control circuit coupled to the comparator and configured to provide the voltage ramp signal, wherein a rate of change of the voltage ramp signal is opposite in sign to a rate of change of the integration voltage during the integration period.

4. The imaging system unit cell according to claim 3, wherein the voltage ramp signal is substantially linear and the integration voltage is substantially linear during the integration period.

5. The imaging system unit cell according to claim 2, wherein the voltage ramp signal includes a time delay, the voltage ramp signal being set to a constant value during the time delay, and wherein the control circuit is configured to adjust the time delay.

6. The imaging system unit cell according to claim 5, wherein the control circuit is configured to adjust the time delay to adjust a maximum photo-current receivable by the transimpedance amplifier circuit.

7. The imaging system unit cell according to claim 6, wherein the graycode counter is configured to sweep a range of digital counter values, the digital counter value including a median value within the range when the intersection of the voltage ramp signal and the integration voltage corresponds to substantially 25% of the maximum photo-current.

8. A method of detecting an image, the method comprising:
   generating, with a photodetector, a photo-current in response to receiving optical radiation at the photodetector;
   integrating, with a transimpedance amplifier circuit, an electrical charge accumulated from the photo-current to provide an integration voltage at an output node of the transimpedance amplifier circuit during an integration period;
   receiving the integration voltage and a voltage ramp signal at a comparator of quantization circuitry coupled to the output node of the transimpedance amplifier, and comparing the integration voltage and the voltage ramp signal;
   determining an intersection of the voltage ramp signal and the integration voltage at an intersection time and latching a digital counter value corresponding to the intersection time via a latch coupled to the comparator; and
   providing a digital signal, the digital signal including at least the digital counter value.

9. The method according to claim 8, further comprising receiving a graycode counter value from a graycode counter coupled to the latch, wherein the digital counter value is the graycode counter value.

10. The method according to claim 9, further comprising generating and providing the voltage ramp signal to the comparator, wherein a rate of change of the voltage ramp signal is opposite in sign to a rate of change of the integration voltage during the integration period.

11. The method according to claim 10, further comprising adjusting a maximum photo-current receivable by the transimpedance amplifier circuit.

12. The method according to claim 11, wherein adjusting the maximum photo-current receivable by the transimpedance amplifier circuit includes adjusting a time delay of the voltage ramp signal, the voltage ramp signal being set to a constant value during the time delay.

13. The method according to claim 11, wherein receiving the graycode counter value includes sweeping a range of digital counter values, the digital counter value including a median value within the range when the intersection of the voltage ramp signal and the integration voltage corresponds to substantially 25% of the maximum photo-current.

14. An imaging system comprising:
a focal plane array including a plurality of unit cells, each unit cell of the plurality including:
a photodetector configured to generate a photo-current in response to receiving optical radiation;
a transimpedance amplifier circuit configured to integrate an electrical charge accumulated from the photo-current during an integration period and provide an integration voltage at an output node, and
quantization circuitry including:
a comparator coupled to the output node and configured to compare the integration voltage and a voltage ramp signal, and determine an intersection of the voltage ramp signal and the integration voltage at an intersection time, and
a latch coupled to the comparator and configured to latch a digital counter value corresponding to the intersection time; and
read-out circuitry coupled to the latch of each unit cell of the plurality and configured to receive the digital signal from the quantization circuitry of each unit cell of the plurality during the integration period, the digital signal including the digital counter value of each latch and the read-out circuit being configured to generate an image based on the digital signal.

15. The imaging system according to claim 14, wherein the read-out circuit includes a double-buffer coupled and in electrical communication with a multiplexer, wherein the double-buffer is configured to receive the digital signal from the quantization circuitry of each unit cell and the multiplexer is configured to multiplex the digital signals and generate a continuous data stream.

16. The imaging system according to claim 15, further comprising a graycode counter coupled to the latch, wherein the digital counter value is a graycode counter value.

17. The imaging system according to claim 16, further comprising a control circuit coupled to the quantization circuitry of each unit cell and configured to provide the voltage ramp signal, wherein a rate of change of the voltage ramp signal is opposite in sign to a rate of change of the integration voltage of each unit cell during the integration period.

18. The imaging system according to claim 17, wherein the voltage ramp signal is substantially linear and the integration voltage of each unit cell is substantially linear during the integration period.

19. The imaging system according to claim 16, wherein the voltage ramp signal includes a time delay, the voltage ramp signal being set to a constant value during the time delay, and wherein the control circuit is configured to adjust the time delay.

20. The imaging system according to claim 19, wherein the control circuit is configured to adjust the time delay to adjust a maximum photo-current receivable by the transimpedance amplifier circuit of each unit cell.

* * * * *